United States Patent [19]

Rattunde et al.

[11] Patent Number: 4,581,001
[45] Date of Patent: Apr. 8, 1986

[54] SIDE-BAR CHAIN FOR INFINITELY VARIABLE CONE-PULLEY TRANSMISSIONS

[75] Inventors: Manfred Rattunde, Bad Homburg; Walter Schopf, Oberursel, both of Fed. Rep. of Germany

[73] Assignee: P.I.V. Antrieb Werner Reimers GmbH & Co. KG, Bad Homburg, Fed. Rep. of Germany

[21] Appl. No.: 669,736

[22] Filed: Nov. 7, 1984

Related U.S. Application Data

[63] Continuation of Ser. No. 285,869, Jul. 22, 1981, abandoned.

[30] Foreign Application Priority Data

Jul. 23, 1980 [DE] Fed. Rep. of Germany ....... 3027834

[51] Int. Cl.$^4$ .......................................... F16G 13/04
[52] U.S. Cl. .................... 474/214; 474/215; 474/216; 474/217
[58] Field of Search ............... 474/202, 206, 212, 214, 474/215, 216, 217

[56] References Cited

U.S. PATENT DOCUMENTS

| Re. 12,844 | 8/1908 | Morse | 474/215 X |
|---|---|---|---|
| 721,643 | 2/1903 | Willie | 474/245 |
| 1,273,001 | 7/1918 | Rockenfield | . |
| 1,644,656 | 10/1927 | Belcher | 474/216 |
| 2,669,879 | 2/1954 | Pierce | 474/217 |
| 3,043,154 | 7/1962 | Karig et al. | 474/215 |
| 3,049,933 | 8/1962 | Besel | 474/242 |
| 3,213,699 | 10/1965 | Terepin | 474/215 |
| 3,353,421 | 11/1967 | Ketterle et al. | 474/215 |
| 3,540,302 | 11/1970 | Bendall | . |
| 3,742,776 | 7/1973 | Avramidis | 474/215 |
| 3,916,709 | 11/1975 | Steuer et al. | 474/242 |
| 4,273,206 | 6/1981 | van der Lely | 180/62 |
| 4,337,057 | 6/1982 | Harowitz et al. | 474/242 |

FOREIGN PATENT DOCUMENTS

| 1146316 | 3/1963 | Fed. Rep. of Germany . | |
|---|---|---|---|
| 139981 | 6/1980 | Fed. Rep. of Germany . | |
| 290927 | 5/1928 | United Kingdom | 474/216 |
| 321329 | 11/1929 | United Kingdom | 474/217 |
| 358561 | 3/1972 | U.S.S.R. . | |

Primary Examiner—James A. Leppink
Assistant Examiner—Frank McKenzie
Attorney, Agent, or Firm—Spencer & Frank

[57] ABSTRACT

A side-bar chain for an infinitely variable cone-pulley transmission which chain includes chain links composed of individual side-bars and joint pieces connecting the links together, with each joint piece being composed of a pair of rocker pieces pushed into apertures of the side-bars, the rocker pieces having end faces extending laterally of the length of the chain for transmitting friction forces between associated friction pulley sheaves and the side-bar chain, and each rocker piece being connected with its associated side-bars by being interlocked therewith to be secured against movement in the direction of pivoting between adjacent links. Each said side-bar presents two end webs spaced apart in the running direction of the chain, extending transverse to the running direction and to the length of the rocker pieces, and each bounding a side-bar aperture. Each rocker piece is configured to bear against a respective end web of each associated side-bar at two abutment regions spaced apart in the direction in which its associated end webs extend. The dimension of each said rocker piece in the direction in which its associated webs extend is substantially equal to the distance between its associated abutment regions.

22 Claims, 13 Drawing Figures

SIDE-BAR CHAIN FOR INFINITELY VARIABLE CONE-PULLEY TRANSMISSIONS

This application is a continuation, of application Ser. No. 06/285,869, filed July 22, 1981 now abandoned.

BACKGROUND OF THE INVENTION

The invention relates to a side-bar chain for infinitely variable cone-pulley transmissions which chain is composed of joint pieces connecting individual chain links and formed as pairs of rocker pieces pushed into apertures of the side-bars. The end faces of the rocker pieces transmit the friction forces between the friction pulley sheaves and the side-bar chain, and the rocker pieces are connected with associated side-bars with a shape-locking securing in rotation.

Such side-bar chains are known in many forms. By way of example reference may be made to German Pat. Nos. 1,065,685, 1,119,065, 1,302,795 and 2,356,289. It also appears from these printed documents that the chains can be assembled in a double side-bar structure, as disclosed in German Pat. No. 1,065,685, or a triple side-bar structure, as disclosed in German Pat. No 1,119,065, and shown in FIG. 14 thereof, where the double side-bar structure, with greater intervals of the pairs of rocker pieces in the running direction, is of narrower construction transversely of the running direction, while the triple side-bar structure, while resulting in a greater width transversely of the running direction of the chain, on the other hand renders possible a reduction in the intervals of the pairs of rocker pieces, that is a reduction of the chain pitch.

This chain pitch is important in several respects. Firstly, the number of the pairs of rocker pieces possible per unit of length of the chain, and thus the number of their end faces, determines the friction force which can be transmitted between friction pulley sheaves and chain. Next the chain pitch considerably determines the behavior of the chain as regards noise, since the entry of the rocker pieces between the cone pulley sheaves involves an impact-type noise which becomes the louder the greater is the chain pitch. Finally, in the case of a coarse chain pitch, the course of the chain in the looping arc between the cone pulley sheaves is made very polygonal, that is to say has relatively great breaks in the force direction, which naturally has an unfavorable effect.

For these reasons the chains of triple side-bar structure would appear preferable. However these chains are not used in practice, since in comparison with chains of equal performance of double side-bar structure they have a width which is half again as great transversely of the running direction. Because of the correspondingly increased chain weight, this leads to increased loading by centrifugal force and moreover, by way of the increased distance between the cone pulleys, has an effect upon the structural size of the entire transmission. The avoidance of these disadvantages predominates by far in comparison with the considerations discussed in connection with the chain pitch.

SUMMARY OF THE INVENTION

It is an object of the invention to provide a modified side-bar chain of the initially described type whose chain pitch is considerably shortened in order thus to achieve a smoother running of the chain, a higher force transmission capacity and a better polygonal formation, without requiring any additional means in comparison with the known chains.

The above and other objects are achieved, according to the invention, in a side-bar chain for an infinitely variable cone-pulley transmission which chain includes chain links composed of individual side-bars and joint pieces connecting the links together, with each joint piece being composed of a pair of rocker pieces pushed into apertures of the side-bars, the rocker pieces having end faces extending laterally of the length of the chain for transmitting friction forces between associated friction pulley sheaves and the side-bar chain, and each rocker piece being connected with its associated side-bars by being interlocked therewith to be secured against movement in the direction of pivoting between adjacent links, by forming each side bar to include two end webs spaced apart in the longitudinal, or running, direction of the chain, extending transverse to the running direction and to the length of the rocker pieces, and each bounding a side-bar aperture, and forming each rocker piece to bear against a respective end web of each associated side bar at two abutment regions spaced apart in the direction in which its associated end webs extend, and so that its dimension in the direction in which its associated webs extend is substantially equal to the distance between its associated abutment regions.

The resulting force transmission from each rocker piece to each associated side-bar at two mutually remote abutment regions achieves the object that both the end webs of the side-bar, and the longitudinal webs, extending in the running direction of the chain, are subjected substantially only to tension stresses and considerable bending stresses no longer load the webs, as in the known chains, which bending stresses cause hish stress peaks at the edges of the apertures. Due to the better exploitation of the side-bar material, the web widths can be reduced, and this reduction of the widths of the radially extending end webs renders possible a reduction in the chain pitch. Moreover, the force relations established in accordance with the invention result in the possibility of making the cross section of the rocker pieces narrower in the running direction and greater in the radial direction, so that in this way, and due to the resulting substantially more rectangular configuration of the side-bars, the chain pitch can further be reduced. As a whole, with the measures in accordance with the invention success has been achieved in constructing a chain of triple side-bar structure which, for equal power transmission capacity, is not wider than the corresponding known double side-bar chain structure.

It is self-evident, along the lines of the invention, the distance of the abutment region between each rocker piece and side-bar is made as large as possible within the bounds of rational dimensioning, and there are no restrictions inasmuch as there is construction space available in any case in the radial direction.

According to one advantageous embodiment, the resultant of the bearing forces between a rocker piece and side-bar at each abutment region extends at about 45° to the direction of running of the side-bar chain. Depending on the form of the rocker pieces, these abutment regions can be linear, but they can also have an arcuate form. The arrangement can be made such that the shape-engaging, or interlocking, securing in rotation is at the same time formed by the engagement between the end webs and rocker pieces at the abutment regions.

The rocker pieces of each pair can be supported against one another in a manner known per se through convex rocker faces directed towards one another, and the side-bars, in a manner likewise known per se, can have a middle web located between the apertures for the rocker piece pairs and extending in the radial direction of the endless side-bar chain.

However, according to another embodiment, the rocker faces which are directed toward, and supported against, one another, of a rocker piece pair can be formed so that one such face is concave and the other convex, the convex rocker face having the smaller radius of curvature. Along the same lines, however, it is also possible for the faces of a rocker piece pair which are directed towards one another to include similarly convexly formed, mutually opposite zones between which a suitable body of circular cross section is inserted as a pressure-transmitting means.

This formation of the rocker piece pairs has the consequence that the side-bars are no longer required to perform the function of mutually centering the rocker pieces of a rocker piece pair, whereby the necessity is also eliminated of accommodating the rocker piece pairs, as in the known case, in apertures of the side-bars which entirely enclose them.

Rather, according to the invention, the possibility now exists of forming the side-bars without a radially extending middle web between the apertures for the rocker piece pairs.

DESCRIPTION OF THE PREFERRED EMBODIMENTS

Figure 1:
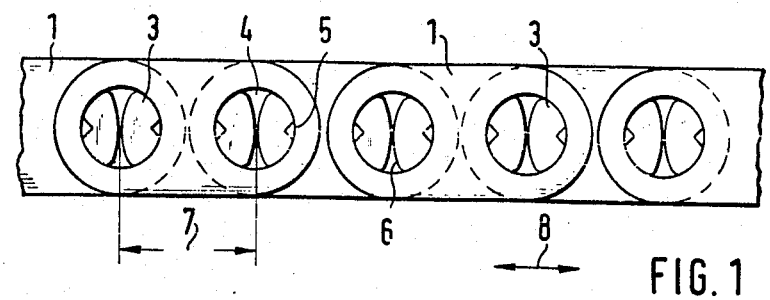
FIG. 1 is a side elevational view of a known side-bar chain with double side-bar structure.

FIG. 1 shows, in side elevation, a piece of side-bar chain consisting of normal chain side-bars 1. The links formed by the side-bars 1 are articulatedly connected with one another through articulation pieces which consist of pairs of rocker pieces 3 which are inserted into the apertures 4 of the side-bars. The rocker piece of each pair is secured against pivotal movement relative to its associated side-bars in each case through an interlocking or form-locking connection 5.

The rocker pieces 3 have convex rocker faces 6 directed towards one another, by means of which they can roll on one another, resulting in the articulated mobility between the neighboring chain links.

The individual joints present a distance 7 from center to center, which is generally called the chain pitch. The size of this chain pitch 7 is dependent upon the size of the rocker pieces 3 in the running direction 8 of the chain 9 and on the spacing which must be provided between the individual apertures 4.

Figure 2:
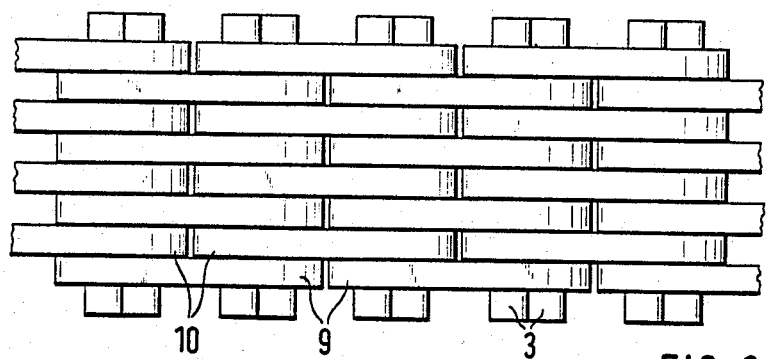
FIG. 2 is a plan view of the structure of FIG. 1.

FIG. 2 shows the known side-bar chain according to FIG. 1 in plan view. Here it can be seen that the chain is assembled in what is called the double side-bar structure, which signifies that in each case two lateral end webs 9 and 10, respectively, of adjacent chain side-bars stand side by side between two successive pairs of rocker pieces 3, whereby the spacing between successive joints formed by rocker piece pairs is correspondingly determined.

Figure 3:
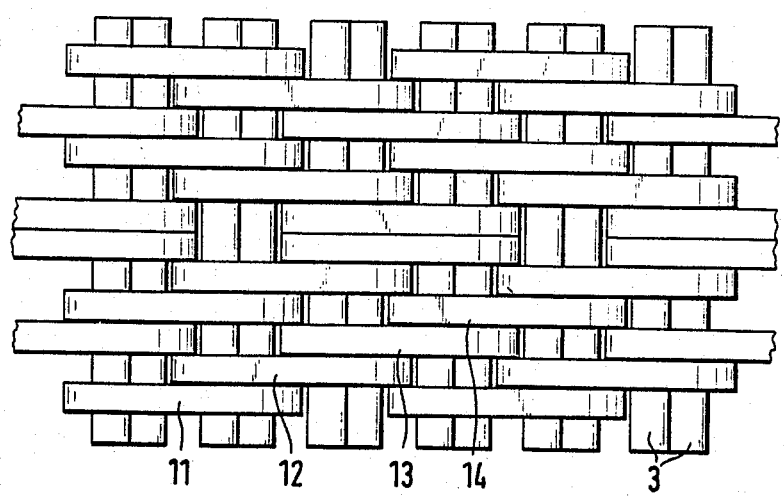
FIG. 3 is a plan view of a triple side-bar structure of a side-bar chain.

According to FIG. 3 it can be seen how the initially mentioned triple side-bar structure is established. Here, in the direction of the width of the chain, or laterally, successive side-bars 11, 12, 13 and 4 are staggered each by one chain pitch in relation to one another in the running direction of the chain. This arrangement, while resulting in a 50% widening of the chain transversely of the running direction, makes it possible, however, on the other hand to reduce the distance between successive joints formed by pairs of rocker pieces 3 to about one-half that of the structure shown in FIG. 2.

What has been described hitherto with reference to FIGS. 1 to 3 relates to known side-bar chains for cone-pulley looping-type transmissions, although the chains according to FIG. 3 have not as yet been constructed commercially because they have a negative influence upon the construction size of a transmission, the material required and the centrifugal forces which act on the chain.

Figure 4:
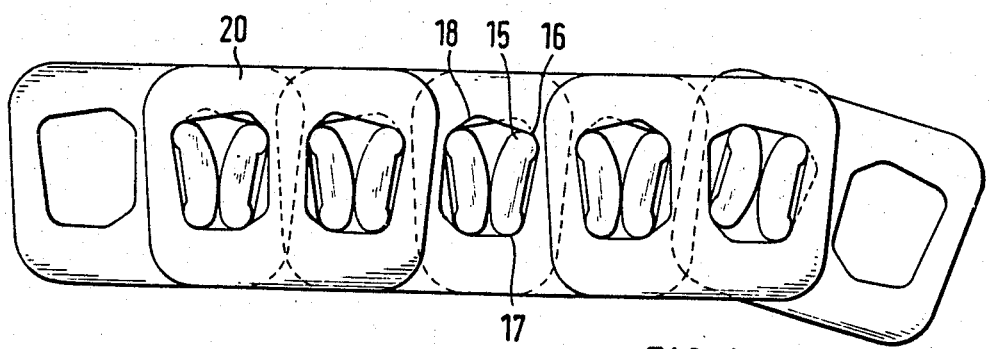
FIG. 4 is a side elevational view of a preferred embodiment of a side-bar chain according to the invention.
Figure 5:
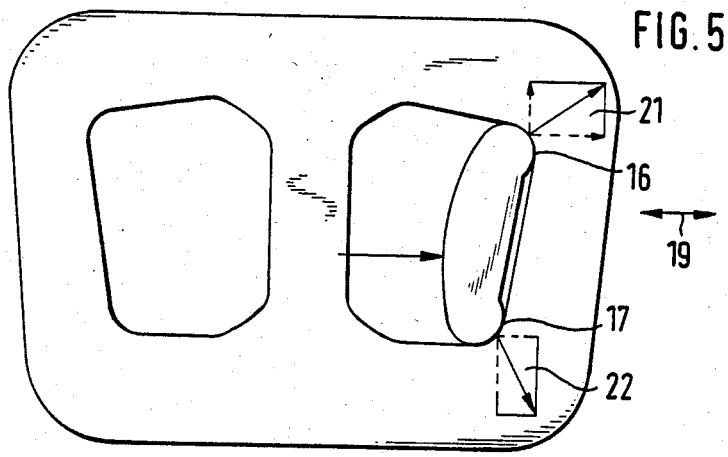
FIG. 5 is a side elevational detail view, to an enlarged scale, of a side-bar and rocker piece of the chain of FIG. 1.
Figure 6:
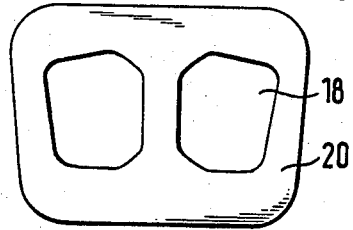
FIG. 6 is a side elevational view of one side-bar of the chain of FIG. 4.

FIGS. 4 to 6 show a first embodiment of a side-bar chain according to the invention. Here each rocker piece 15 has a configuration such that it abuts on the aperture 18 of each associated side-bar 20 only at two regions 16 and 17 with the angle of each resultant force in relation to the running direction 19 of the chain amounting to 45° on average. Between the abutment regions 16 and 17 the rocker pieces 15 are free from, i.e., do not contact, the side-bars 20 of the chain.

Construction of a side-bar chain in accordance with the invention permits the rocker pieces 15 to be made larger in the direction perpendicular to the running direction 19, i.e. in the vertical direction of FIG. 4 in order on the other hand to permit them to be made narrower in the direction 19, which permits a corresponding modification of the form of the apertures 18 and especially a reduction of the pitch between the individual joints formed by the rocker pieces 15.

FIG. 5 furthermore shows, by means of the force diagrams 21 and 22, that the angles of the resultants at the abutment regions 16 and 17 in relation to the running direction 19, with the side-bar chain stretched out, lie in the vicinity of 45° but are different from one another.

Figure 7:
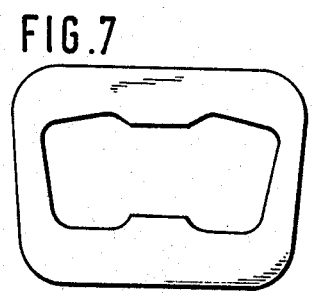
FIG. 7 is a view similar to that of FIG. 6 of another embodiment of a side-bar.

FIG. 6 shows a single side-bar 20 of a chain according to FIG. 4, while FIG. 7 shows a corresponding side-bar which is modified, however, in that there is no middle web between the two apertures of the side-bar. This results in a further saving of material and weight.

Figure 8:
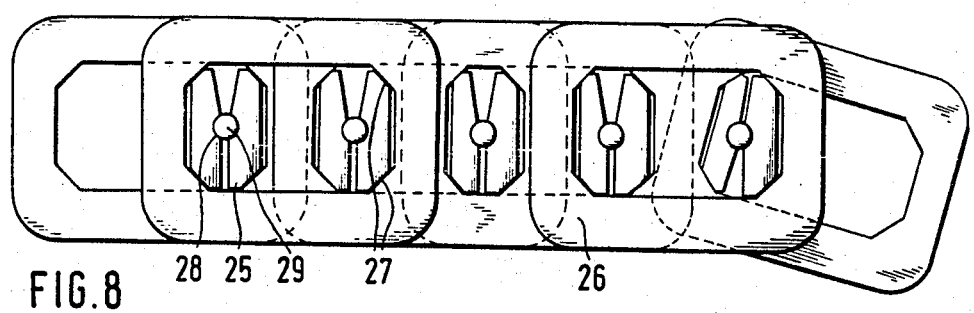
FIG. 8 is a view similar to that of FIG. 1 of a further side-bar chain embodiment in accordance with the invention in the form of a triple side-bar structure.

FIG. 8 shows a further embodiment having a triple side-bar structure.

In this embodiment similarly formed rocker pieces 25 are supported in relation to the chain links, or side-bars 26 in a manner similar to the embodiments of FIGS. 4 to 7, at two abutment regions 27 each forming an angle of approximately 45° to the running direction. The two rocker pieces 25 forming a single joint have sufficient undercut on their sides directed towards one another for the necessary mutual pivoting movement to occur and furthermore have at their vertical centers a concave groove 28 of circular cross-section into which a rod 29 is inserted to form a mutual articulated connection between the two pieces. Due to this formation of the articulated connection there is at the same time a mutual pivoting centering of adjacent rocker pieces, so that other measures for their guidance become superfluous.

Figure 9:
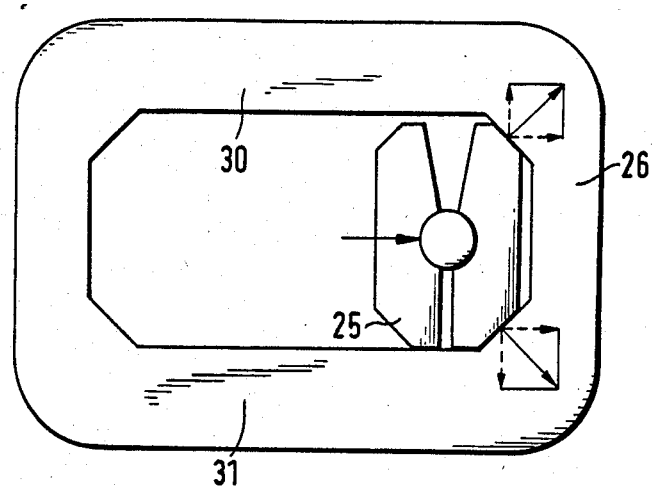
FIG. 9 is an elevational detail view of a part of the structure of FIG. 8 to an enlarged scale.

FIG. 9 shows, to an enlarged scale, a side-bar 26 with a joint consisting of two rocker pieces 25, and it can also be seen that the side-bar web 30 which is radially to the outside in the complete endless chain, and the web 31, which is radially to the inside in the endless chain, are of respectively different widths, or thickness, to allow for the force differences, caused by running radii, in the looping arc between the cone pulleys.

Figure 10:
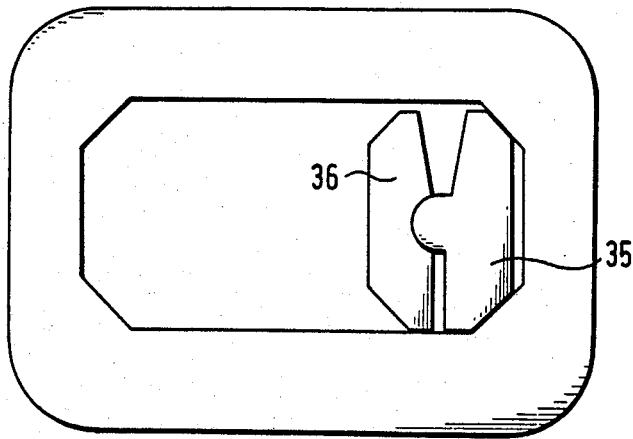
FIGS. 10 and 11 are views similar to that of FIG. 9 of two different, modified, rocker piece embodiments with self-centering.
Figure 11:
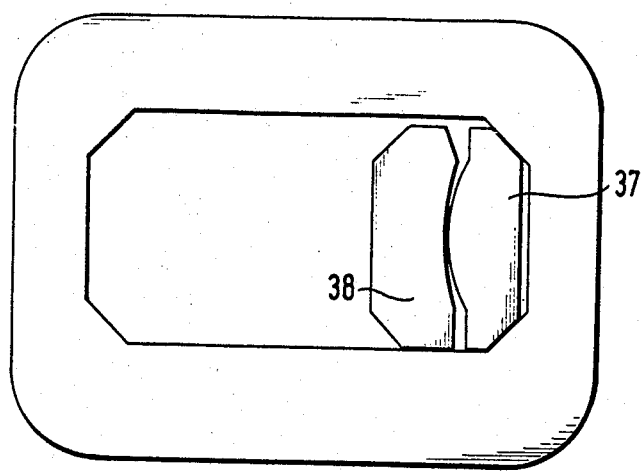

FIGS. 10 and 11 show pairs of rocker pieces 35, 36 and 37, 38 of modified structure which likewise are again of self-centering formation, in that each rocker piece 35 and 37 has a convex mating face and each associated rocker piece 36 and 38 has a concave face mating with the opposite rocker piece.

Figure 12:
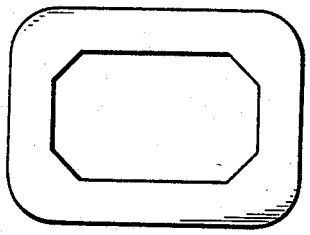
FIG. 12 is a view similar to FIG. 6 of one side-bar of the structures shown in FIGS. 8 to 11.

A side-bar comparable to the side-bars according to FIGS. 8 to 11 is represented again, alone, in FIG. 12.

Figure 13:
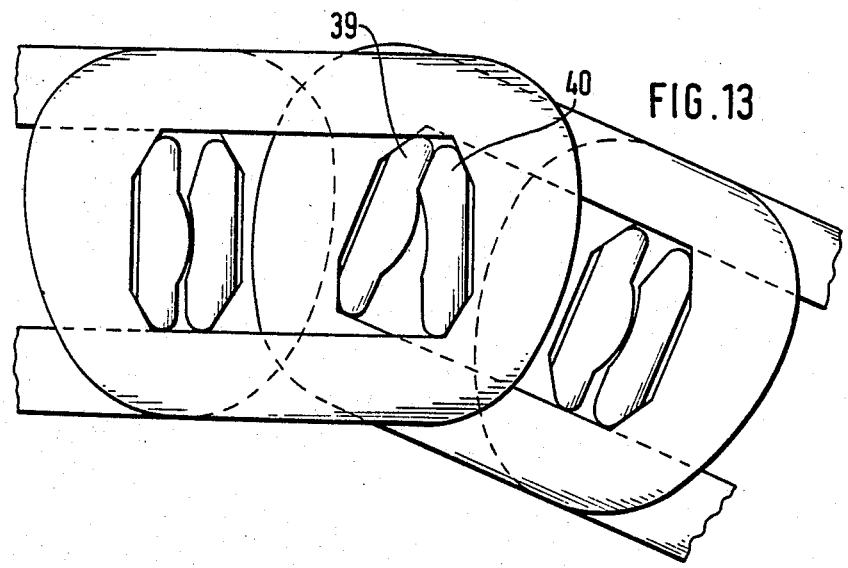
FIG. 13 is a side elevational view of another side-bar chain embodiment in accordance with the invention with two different relative positions of adjacent chain links.

FIG. 13 shows a side-bar chain with joints similar to those of FIG. 11 in the assembled condition with rocker pieces 39 and 40 differing somewhat from those of FIG. 11. In FIG. 13, two side-bars have a maximum inclination to one another, so that the manner in which two associated rocker pieces roll in a self-centering manner on one another becomes apparent. In this case, surfaces adjacent the arcuate mating faces come to bear against one another.

It will be understood that the above description of the present invention is susceptible to various modifications, changes and adaptations, and the same are intended to be comprehended within the meaning and range of equivalents of the appended claims.

What is claimed is:

1. In a side-bar chain for an infinitely variable cone-pulley transmission which chain is an endless chain extending along a closed path in its longitudinal direction and includes chain links composed of individual side-bars and joint pieces connecting the links together, with each joint piece being composed of a pair of rocker pieces inserted into apertures of the side-bars, the rocker pieces having end faces extending laterally of the length of the chain for transmitting friction forces between associated friction pulley sheaves and the side-bar chain, each rocker piece being connected with its associated side-bars by being interlocked therewith to be secured against movement in the direction of pivoting between adjacent links, and each side-bar having a generally rectangular configuration and being composed of two straight longitudinal webs extending in the longitudinal direction of the chain and two end webs spaced apart in the longitudinal direction of the chain, extending transverse to the longitudinal direction and to the length of the rocker pieces, and each bounding a side-bar aperture, the improvement wherein: each said rocker piece is configured to bear against a respective end web of each associated side-bar only at two abutment regions spaced apart in the direction in which its associated end webs extend; each said rocker piece and said respective end web of each associated side-bar are configured to form, between said two abutment regions, a clearance region in which said rocker piece is permanently maintained out of contact with said respective end web of each associated side-bar at all operating tensile load levels of said chain; and the dimension of each said rocker piece in said direction in which its associated end webs extend is substantially equal to the distance between its associated abutment regions.

2. Side-bar chain as defined in claim 1 wherein each said abutment region is configured to cause the direction of the bearing force of each said rocker piece against each associated side-bar end web to extend at an angle of the order of 45° to the longitudinal direction of the chain.

3. Side-bar chain as defined in claim 1 wherein each said rocker piece is configured such that engagement of its abutment regions with each associated side-bar establishes the interlocked connection therebetween.

4. Side-bar chain as defined in claim 1 wherein said rocker pieces of each said pair present mutually facing convex rocker faces via which these rocker pieces bear against one another, and each said side-bar presents a middle web located between said end webs and extending transverse to the longitudinal direction of the chain, such that each said side-bar presents two apertures separated by said middle web.

5. Side-bar chain as defined in claim 1 wherein said rocker pieces of each said pair present mutually facing rocker faces via which these rocker pieces bear against one another, with one said rocker face having a concave form and the other said rocker face a convex form with a radius of curvature smaller than that of said rocker face of concave form.

6. Side-bar chain as defined in claim 5 wherein each said side-bar presents a single aperture which defines a continuous space between said two end webs thereof.

7. Side-bar chain as defined in claim 1 wherein said rocker pieces of each said pair present mutually facing rocker faces, said rocker faces of each said rocker piece pair have similar, mutually aligned regions of concave form, and each said joint piece further comprises a cylindrical member engaging said regions of concave form for transmitting compressive forces between said rocker pieces.

8. Side-bar chain as defined in claim 7 wherein each said side-bar presents a single aperture which defines a continuous space between said two end webs thereof.

9. Side-bar chain as defined in claim 1 wherein each said rocker piece is formed to have projections defining its said abutment regions and protruding, in the longitudinal direction of said chain, beyond the clearance region associated end with said rocker piece and toward said associated webs.

10. Side-bar chain as defined in claim 1 wherein each said aperture has the general form of a polygon and each said abutment region is located essentially at a respective corner of said polygon of each associated side-bar.

11. Side-bar chain as defined in claim 2 wherein said rocker pieces of each said pair present mutually facing rocker faces via which these rocker pieces bear against one another, with one said rocker face having a concave form and the other said rocker face a convex form with a radius of curvature smaller than that of said rocker face of concave form.

12. Side-bar chain as defined in claim 11 wherein each said side-bar presents a single aperture which defines a continuous space between said two end webs thereof.

13. Side-bar chain as defined in claim 3 wherein said rocker pieces of each said pair present mutually facing rocker faces via which these rocker pieces bear against one another, with one said rocker face having a concave form and the other said rocker face a convex form with a radius of curvature smaller than that of said rocker face of concave form.

14. Side-bar chain as defined in claim 13 wherein each said side-bar presents a single aperture which define a continuous space between said two end webs thereof.

15. Side-bar chain as defined in claim 2 wherein said rocker pieces of each said pair present mutually facing rocker faces, said rocker faces of each said rocker piece pair have similar, mutually aligned regions of concave form, and each said joint piece further comprises a cylindrical member engaging said regions of concave form for transmitting compressive forces between said rocker pieces.

16. Side-bar chain as defined in claim 15 wherein each said side-bar presents a single aperture which defines a continuous space between said two ends webs thereof.

17. Side-bar chain as defined in claim 3 wherein said rocker pieces of said pair present mutually facing rocker faces, said rocker faces of each said rocker piece pair have similar, mutually aligned regions of concave form, and each said joint piece further comprises a cylindrical member engaging said regions of concave form for transmitting compressive forces between said rocker pieces.

18. Side-bar chain as defined in claim 17 wherein each said side-bar presents a single aperture which defines a continuous space between said two end webs thereof.

19. Side-bar chain as defined in claim 1 wherein the dimension of each said side-bar in the direction in which said end webs extend is constant along the longitudinal direction of the chain.

20. Side-bar chain as defined in claim 19 wherein each said side-bar and its associated joint pieces are configured such that the forces exerted by said joint pieces on said side-bars create substantially only tension stresses in said two longiutinal webs and said two end webs of each said side-bar.

21. Side-bar chain as defined in claim 1 wherein each said side-bar and its associated joint pieces are configured such that the forces exerted by said joint pieces on said side-bars create substantially only tension stresses in said two longitudinal webs and said two end webs of each said side-bar.

22. In an infinitely variable cone-pulley transmission composed of two cone pulleys and an endless side-bar chain extending along a closed path in its longitudinal direction between the pulleys and in frictional force transmitting relation with the pulleys, the chain including links composed of individual side-bars and joint pieces connecting the links together, with each joint piece being composed of a pair of rocker pieces inserted into apertures of the side-bars, the rocker pieces having end faces extending laterally of the length of the chain for transmitting friction forces between associated friction pulley sheaves and the side-bar chain, each rocker piece being connected with its associated side-bars by being interlocked therewith to be secured against movement in the direction of pivoting between adjacent links, and each side-bar having a generally rectangular configuration and being composed of two straight longitudinal webs extending in the longitudinal direction of the chain and two end webs spaced apart in the longitudinal direction of the chain, extending transverse to the longitudinal direction and to the length of the rocker pieces, and each bounding a side-bar aperture, the improvement wherein: each said rocker piece is configured to bear against a respective end web of each associated side-bar only at two abutment regions spaced apart in the direction in which its associated end webs extend; each said rocker piece and said respective end webs of each associated side-bar are configured to form, between said two abutment regions, a clearance region in which said rocker piece is permanently maintained out of contact with said respective end web of each associated side-bar at all operating tensile load levels of said chain; and the dimension of each said rocker piece in said direction in which its associated end webs extend is substantially equal to the distance between its associated abutment region.

* * * * *